March 21, 1950     I. G. TAMAGNA ET AL     2,501,550
ELECTROCARDIOGRAM READING DEVICE
Filed Sept. 4, 1946
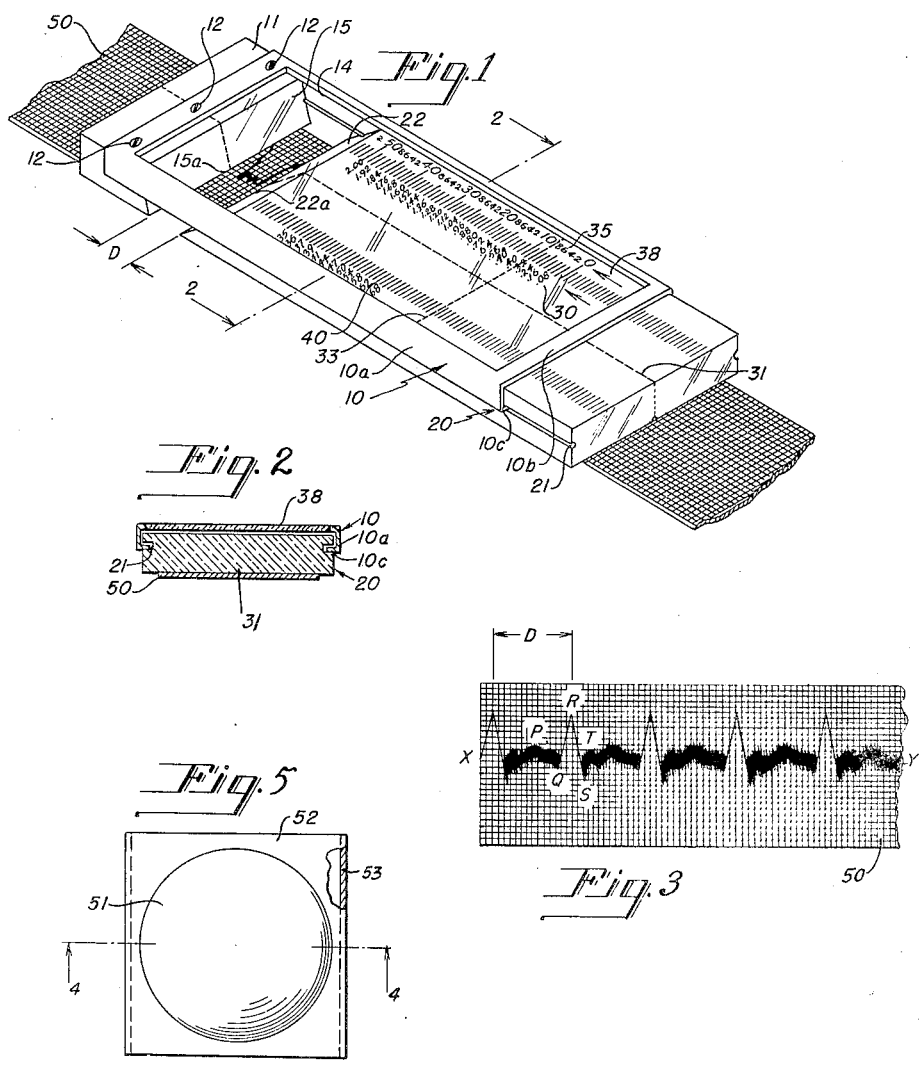
INVENTORS
Irene G. Tamagna
BY Julian Gorski
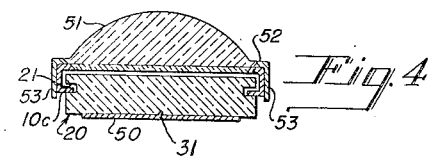
ATTORNEY Patented Mar. 21, 1950

2,501,550

UNITED STATES PATENT OFFICE 2,501,550

ELECTROCARDIOGRAM READING DEVICE

Irene G. Tamagna, New York, and Julian Gorski, Long Beach, N. Y.

Application September 4, 1946, Serial No. 694,776

5 Claims. (Cl. 33—1)

This invention is concerned with the provision of a novel and improved device designed for the reading of electrocardiogram charts used by physicians in helping to make diagnosis of a patient's heart condition.

As is generally known, electrocardiogram charts or records are made in conjunction with suitable electrical apparatus to aid the physician in determining whether or not the heart action is normal. One of the most important considerations in the use of this process of diagnosis lies in the accurate reading and interpretation of the chart. In such interpretation it is often necessary for the physician to accurately guage distances and to compare such distances, such as, for example the height of the different waves with respect to the base line, or distances between waves. To properly do this, it was heretofore necessary for the physician to use scale rules as well as compasses. It is therefore one of the principal objects of our invention to provide, in a single unitary device, all the necessary aids to facilitate accurate and quick reading of electrocardiogram charts.

Another object of our invention is to provide an electrocardiogram device of the character described which shall comprise relatively few and simple parts, which shall be easy to operate, which shall be compact so that it may be conveniently carried in the physician's pocket and which at the same time shall represent a general improvement in the art.

Other objects of our invention will become apparent from the description to follow or will hereinafter be pointed out.

In the accompanying drawings,

Fig. 1 is a perspective view of an electrocardiogram reading device constructed and arranged in accordance with our invention and illustrating the manner of its use;

Fig. 2 is a cross-sectional view taken substantially along the line 2—2 of Fig. 1;

Fig. 3 is a fragmentary plan view of an electrocardiogram chart of the customary type and in connection with which our device is adapted to be used;

Fig. 4 is a view similar to Fig. 2, but illustrating a modified form of our invention; and Fig. 5 is a top plan view thereof, partly in section.

Referring now in detail to the drawings and more particularly to Figs. 1 and 2 thereof, we have shown an electrocardiogram reading device constructed and arranged in accordance with our invention and comprising a frame 10 which is preferably made of relatively thin metallic material, such as for example, aluminum.

The said frame 10 may be made from a single flat sheet of material with portions 10a adjacent the longitudinal edges thereof, bent over substantially at right angles to the top main body portion 10b, to form a channel shaped longitudinal member. The said frame 10 is permanently fixed at one end thereof to a block 11 of any suitable material, such as for example, transparent plastic material. The method of attaching the frame 10 to the block 11 may be by any suitably well known means, such as for example, the screws 12 passing through the main body portion 10b of the frame and entering the block 11. The frame 10 is provided with a rectangular shaped window opening 14 in the main body portion thereof for substantially the full length thereof, the purpose and function of which will soon become apparent. It is noted that the block 11 extends forwardly of the frame 10 so that a portion thereof is visible through the opening 14 of the frame 10 when looking downwardly from the top. It is noted that the innermost upright wall 15 of the block 11 is inclined outwardly in an upward direction from the bottom thereof so as to provide acute angle between the bottom surface of the block 11 and the wall 15 thereof, thereby providing a sharp transverse clearly visible gauging edge 15a.

Slidably mounted in the frame 10 is a longitudinal block 20 which is preferably of similar transparent plastic material as the block 11. It is noted that the width of the block 20 is such as to enable the same to slidably fit snugly between the depending walls 10a of the frame 10 and that the thickness of the said block 20 is greater than the depth of the said walls 10a and equal to the thickness of the block 11, so that the flat bottom surfaces of the blocks 11 and 20 are in the same plane. To guide the slidable movement of the block 20 in the frame 10, the lower, free longitudinal edges 10c of the walls 10a are bent inwardly towards each other for a predetermined short distance. The said inturned edge portions 10c are frictionally slidably received in corresponding grooves 21 in the longitudinal sides of the block 20. In accordance with our invention, the forward end wall 22 of the block 20 is inclined upwardly from the bottom surface thereof in a manner similar to the tapering of the wall 15 to provide an acute angle between the bottom surface of the block 20 and the said wall 22, as clearly shown in Fig. 1.

There is thus provided a second sharp, clearly visible, transverse gauging edge 22a.

It is thus seen from the above described construction that the relative distance between the gauging edges 15a and 22a of the walls 15 and 22 respectively may be altered to any desired amount by manually grasping the block 20 and slidably moving the same toward and away from the fixed block 11, for the purpose of gauging distances on the electrocardiogram chart 50 in a manner which will hereinafter be explained.

In accordance with our invention the top surface of the block 20 is provided with the following scales which we have discovered facilitate the reading and interpretation of the data on the chart 50, by the physician. A calculated interval scale 30 is arranged to indicate the distances in seconds; a millimeter scale 35 and a heart rate scale 40 based on calculated heart rates of a regular rhythm. The time scale 30 and millimeter scale 35 may be disposed in a longitudinal line parallel to and adjacent one side of the block 20 and the heart rate scale may be disposed in a longitudinal line parallel to and adjacent the opposite side of said block 20. These scales may be imprinted directly on the top surface of the block 20 or may be provided thereon in any other well known manner for applying scales to surfaces.

Most cardiogram charts do not have a base line thereon, thereby increasing the difficulty of accurate reading. We therefore provide a longitudinal axis line 31 which may also be imprinted on the bottom surface of the block 20 and a continuation thereof in alignment therewith is provided on the bottom surface of the fixed block 11.

It is thus seen from the above that we have provided a base line adapted to directly and closely overlie the chart and to provide a base line for the same to facilitate accuracy in reading. Due to the fact of the transparency of the blocks 11 and 20 the base line 31 of the device may be readily aligned with the lines on the chart 50.

The entire opening 14 in the frame 10 may be covered with transparent window material 30 which may be glass or other suitable material for the purpose and a hair line 33 transversely disposed at right angles with respect to the axis line 31 is provided on the bottom surface of said glass window 30, designed to take readings from the scales 30, 35 and 40 on the sliding block 20.

If desired a suitable magnifying lens unit shown in Figs. 4 and 5 may be provided to facilitate the reading of the scales with respect to the hair line 33 and which may be adapted to be slidably shifted to the open space between the walls 15 and 22 between which there is revealed the chart 50. The said magnifying lens unit may comprise a rectangular flat member 52 of any suitable material having a pair of depending side walls 53. Mounted in a suitable opening in the member 52 is a magnifying lens 51 of the type desiged to focus light directly on the matter to be viewed below. As shown in Fig. 4 of the drawings the lens unit is adapted to be removably mounted on the frame 10 by merely placing the same over the said frame with the depending walls 53 snugly contactively engaging the side walls 10a of the said frame. The said lens unit may thus be slidably moved along the frame 10 to any point where it is desired for effective use.

The use and application of our device will now be described in connection with a standard type of chart 50 shown in Fig. 3 of the drawings. If the physician desires to make a determination of regularity of the heart beat, the device as illustrated in Fig. 1, is placed on the chart 50 so that the axis line 31 coincides with a selected line x—y on the chart. The transverse gauging edge 15a of the wall 15 is then set over the peak of the R or S wave and the bottom transverse gauging edge 22a of the wall 22 of the sliding block 20 is moved outwardly to the peak of the next R or S wave. This distance designated by the letter D in Figs. 1 and 3 represents a rate of heart beat. In order to determine the regularity of the heart rate this fixed distance D is used for comparison with other corresponding intervals between R or S waves.

If the physician desires to interpret the heart rate, this may be obtained directly from the chart by taking the reading from the heart rate scale of the R—R or S—S interval against the hair line 33.

For reading the time intervals, the sliding block 20 is moved outwardly to the end of the wave whose time is to be measured, while the bottom transverse edge of the wall 15 coincides with its beginning, the exact time interval is then read against the hair line.

To read millimeter distances, the device is placed on the chart 50 with the longitudinal axis line 31 in the direction of the millimeter lines on the chart. The readig of the height, length, depressions, etc., of the different waves is obtained by moving the sliding block 20 from the base line to the apex of the wave and by reading the indicated millimeters against the hair line 33. Such set intervals can be compared with different complexes by simply moving the device over to the various complexes, P, Q, R, S, T.

It is thus seen that in accordance with our invention, we have provided a simple device whereby the physician is able in taking accurate measurements directly from the electrocardiogram chart so that he may be in better position to interpret and diagnose the patient's case.

It is also noted that in accordance with our invention measurements are taken directly on the lower level of the chart and the readings are made at the higher level so that a high degree of precision is possible in reading the electrocardiogram chart.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having described our invention, what we claim and desire to secure by Letters Patent is:

1. For use in reading an electro cardiogram chart, a device comprising a longitudinal frame, said frame comprising a top wall, a pair of depending side walls and angularly bent inwardly extending portions integral with the bottom longitudinal edges of said side walls, a first block member fixedly attached to said frame at one end thereof, a second longitudinal block member, means for mounting said second block member on said frame for sliding movement toward and away from said fixed block member, said means comprising grooves in opposite longitudinal sides of said second block member adapted to frictionally slidably receive therein the said angularly inwardly bent portions of said side walls of said frame, the bottom surfaces of said first and second members being disposed in substantially the same plane, adjacently disposed transverse walls of said first and second block members being inclined so as to form acute angles with the said bottom surfaces of said block members, and a reading scale on the top surface of said movable block member to indicate the amount of movement of said movable block member with respect to said fixed block member, said top wall of said frame being provided with a relatively large opening, rendering visible therethrough said adjacently transverse walls of said first and second block members as well as said reading scale on said movable block member.

2. A device according to claim 1 in which the said opening in the top wall of said frame is provided with a transparent closure, and in which said transparent closure is provided with a transversely disposed hairline on the undersurface thereof against which the said scale is adapted to be read.

3. A device according to claim 1 in which the said second block member is of transparent material and is provided with a longitudinal guide line on the bottom surface thereof adapted to be aligned with selected parallel lines on said cardiogram chart.

4. For use in reading an electro cardiogram chart, a device comprising a longitudinal relatively thin metallic frame, said frame comprising a top wall portion and a pair of longitudinal side walls integral with and depending at right angles therefrom, a relatively short block member of transparent material and of predetermined thickness fixedly attached to one end of said frame, a relatively long block member of transparent material and of substantially the same thickness as said relatively short block member, means for frictionally slidably mounting said relatively long block member on said frame for movement toward and away from said fixed block member, said last named means comprising grooves in the longitudinal sides of said movable block member for receiving therein inturned longitudinal edge portions of said depending side walls of said frame, a plurality of reading scales on the top surface of said movable block member, a relatively large opening in said top wall portion of said frame rendering said relatively short and relatively long blocks as well as said reading scales visible therethrough a fixed mark on said frame against which said scales may be read.

5. A device according to claim 4 in which there is provided on the bottom surface of said transparent block members aligned longitudinal base lines adapted to directly overlie the said chart and to be visible from above through said opening in said top wall portion of said frame and through said transparent block members to facilitate the proper alignment of the device on the chart.

IRENE G. TAMAGNA.
JULIAN GORSKI.

REFERENCES CITED

The following references are of record in the file of this patent:

UNITED STATES PATENTS

| Number | Name | Date |
|---|---|---|
| 139,601 | Nagle | June 3, 1873 |
| 297,056 | Bellows | Apr. 15, 1884 |
| 422,701 | Benzinger et al. | Mar. 4, 1890 |
| 765,471 | Gardiner | July 19, 1904 |
| 869,578 | LeCompte | Oct. 29, 1907 |
| 1,154,673 | Van Ness | Sept. 28, 1915 |
| 1,876,431 | Page | Sept. 6, 1932 |
| 2,088,533 | Phelps | July 27, 1937 |